United States Patent
Subera (10) Patent No.: US 9,528,741 B2
(45) Date of Patent: Dec. 27, 2016

(54) ENERGY SAVING ICEMAKER SYSTEM AND CONTROL MODULE

(71) Applicant: Hankscraft Inc., Reedsburg, WI (US)

(72) Inventor: Ryan M. Subera, Reedsburg, WI (US)

(73) Assignee: Hankscraft, Inc., Reedsburg, WI (US)

( * ) Notice: Subject to any disclaimer, the term of this patent is extended or adjusted under 35 U.S.C. 154(b) by 253 days.

(21) Appl. No.: 14/479,065

(22) Filed: Sep. 5, 2014

(65) Prior Publication Data

US 2015/0068224 A1     Mar. 12, 2015

Related U.S. Application Data

(60) Provisional application No. 61/874,649, filed on Sep. 6, 2013.

(51) Int. Cl.
  *F25C 1/00*   (2006.01)
  *F25C 1/24*   (2006.01)
  *F25C 5/18*   (2006.01)

(52) U.S. Cl.
  CPC ........... *F25C 5/187* (2013.01); *F25C 2600/04* (2013.01); *F25C 2700/04* (2013.01); *F25C 2700/12* (2013.01); *Y02P 60/855* (2015.11)

(58) Field of Classification Search
  CPC ............... F25C 1/00; F25C 1/24; F25C 5/187; F25C 2600/04; F25C 2700/12; F25C 2700/04; Y02P 60/855
  USPC ............................................ 62/66, 340, 132
  IPC ...................................................... Y02P 60/855
  See application file for complete search history.

(56) References Cited

U.S. PATENT DOCUMENTS

| | | |
|---|---|---|
| 2,717,504 A | 9/1955 | Knerr |
| 3,276,225 A | 10/1966 | Linstromberg |
| 3,362,181 A | 1/1968 | Linstromberg |
| 3,712,076 A | 1/1973 | Fox |
| 3,745,779 A | 7/1973 | Bright |
| 4,142,378 A | 3/1979 | Bright |
| 4,697,432 A | 10/1987 | Cole |
| 4,799,362 A | 1/1989 | Chestnut |
| 4,800,731 A | 1/1989 | Cole |
| 4,866,948 A | 9/1989 | Cole |
| 5,596,182 A | 1/1997 | Edwards |
| 5,617,728 A | 4/1997 | Kim et al. |
| 5,735,130 A * | 4/1998 | Lee .......................... F25C 1/04 62/126 |
| 5,768,900 A | 6/1998 | Lee |
| 5,813,238 A | 9/1998 | Lee |
| 5,823,001 A | 10/1998 | Patrick |

(Continued)

FOREIGN PATENT DOCUMENTS

CN     1098495 A     2/1995

OTHER PUBLICATIONS

International Search Report and Written Opinion of the International Searching Authority dated Dec. 22, 2014, for PCT/US2014/054392 filed Sep. 5, 2014.

*Primary Examiner* — Mohammad M Ali
(74) *Attorney, Agent, or Firm* — Boardman & Clark LLP (57) ABSTRACT

A control system for an automatic icemaker including an icemaker module and a control module. The icemaker module includes a DC motor to drive rotation of a twist-type ice cube tray. The control module incorporates an integrated circuit with a programmable digital microprocessor for controlling the functions of the icemaker module. The control module accesses AC power and converts the AC power to DC power for powering a DC motor, an integrated circuit, and a microprocessor.

14 Claims, 8 Drawing Sheets

(56) References Cited

U.S. PATENT DOCUMENTS

| | | |
|---|---|---|
| 5,839,286 A | 11/1998 | Lee |
| 5,881,563 A | 3/1999 | Lee |
| 5,889,243 A | 3/1999 | Edwards |
| 6,148,620 A | 11/2000 | Kumagai |
| 7,146,820 B2 | 12/2006 | Comerci |
| 7,350,369 B2 | 4/2008 | Comerci |
| 7,748,231 B2 * | 7/2010 | Chung .................... F25C 5/187 477/15 |
| 7,841,203 B2 * | 11/2010 | Yoon ......................... F25C 1/04 249/118 |
| 8,181,477 B2 * | 5/2012 | Ducharme ............... F25C 1/08 62/344 |
| 8,408,016 B2 * | 4/2013 | McCollough ............ F25C 5/04 62/135 |
| 8,408,663 B2 * | 4/2013 | Chellappan ........... F25D 25/025 312/331 |
| 8,650,899 B2 * | 2/2014 | Lee ......................... F25C 5/005 62/340 |
| 2006/0174646 A1 | 8/2006 | Comerci |
| 2009/0178420 A1 | 7/2009 | Amonett et al. |
| 2009/0255282 A1 * | 10/2009 | Amonett ................... F25C 1/00 62/137 |
| 2011/0000233 A1 * | 1/2011 | Rybaski .................... F25C 1/04 62/66 |

* cited by examiner

ENERGY SAVING ICEMAKER SYSTEM AND CONTROL MODULE

This application claims priority to U.S. Provisional Application No. 61/874,649 filed Sep. 6, 2013, which is incorporated herein by reference in its entirety.

BACKGROUND

1. Field of the Invention

This invention is related to control systems for automatic icemakers. Specifically, the present invention relates to a control system incorporating a control module and an icemaker module, and method for manufacturing ice in a refrigerator-freezer which reduces energy consumption over known icemakers.

2. Related Art

Many modern refrigerator-freezers include automatic icemakers. Such automatic icemakers typically include a multi-cube ice mold, a source of water, and an ejection mechanism. Water enters the mold, the water is allowed to freeze into a shape (an "ice cube"), and the ejection apparatus transfers the frozen ice cubes to a basin for storage and dispensing.

Typically, the steps of making ice cubes using the above-outlined automatic icemaker are initiated, completed, and/or controlled using an icemaker control system. In some known icemaker control systems, the icemaker has a control module that interacts with the built-in control logic of the refrigerator-freezer. The control module also typically is connected to a direct-current (DC) power supply already provided by the refrigerator. However, in basic refrigerators, neither a DC power supply nor built-in control logic is provided. In those refrigerators, only an alternating-current (AC) power supply and water line is provided to the icemaker. In those known systems which use an AC supply, an electric mold heater is used in conjunction with a control mechanism and a rake-type ejection system to dislodge the ice cubes.

These known control systems have certain limitations. For example, known AC powered control systems typically consume substantial amounts of power by incorporating a thermostat for measuring completion of ice formation. Such thermostat controls are often used with rake-type ejection systems. Such ejection systems require heating the ice tray after freezing, to melt the contact surface of the ice with the tray to permit cube ejection by the rake. Such systems use an electric ice-mold heater, thus requiring power to both freeze and marginally melt the ice cubes, and further increase the amount of heat to be extracted from the mold and freezer compartment. Further, known control systems typically receive power and control logic directly from an associated refrigerator as the known control systems are incorporated into the control equipment of the freezer-refrigerator. In addition, known DC control systems are unable to interact with an AC power outlet provided in the refrigerator. The result of these and other aspects of known AC power and control systems is the use of a considerable amount of power to produce ice cubes.

Accordingly, there is a need for a control system and module for an automatic icemaker which reduces power consumption and improves the energy rating of an associated refrigerator freezer.

SUMMARY OF THE DISCLOSED EMBODIMENTS

The present invention provides one or more examples of embodiments of an improved compact control system for an automatic icemaker. The improved control system reduces energy consumption, and in turn improves the energy rating of an associated refrigerator-freezer by incorporating a number of improvements. The improvements include, but are not limited to, incorporating its own controller to operate the control module, receiving power indirectly from an associated refrigerator or freezer through a conventional AC outlet commonly provided within the refrigerator-freezer, and converting the AC to DC for powering the control module. In addition, the improved system utilizes low-energy consumption thermistors to detect temperatures associated with ice formation, and employs a lower-energy consumption "twist" style ice dispenser to eject formed ice cubes from the icemaker. The present invention works with a basic refrigerator, requiring only an AC outlet and supplemental water valve and associated water line to operate.

In various exemplary embodiments of the present invention, a control system for an automatic icemaker includes a control module which further includes an integrated circuit with a programmable digital microprocessor. This control system also includes a connection to an adapter for engaging an AC outlet provided in the refrigerator. The control module also houses an AC to DC power converter for converting AC current to 12 volt DC to power the icemaker motor, and for further reducing the 12 volt DC to 5 volt DC for powering the control module microprocessor. The 12 volt DC power is then sent to the icemaker module for powering the DC motor which drives the icemaker.

In various exemplary embodiments of the present invention, a control system for an automatic icemaker includes means for monitoring the freezing of the ice in the multi-cube ice tray. The controller performs this function through a connection to a low energy consumption thermistor. The thermistor detects the temperature of the ice tray containing water for freezing. This thermistor may be of a negative temperature coefficient (NTC) type. The controller may also have an on-board timing circuit, which is triggered when the thermistor detects that the water filled mold reaches a certain temperature selected for optimum freezing of the ice cubes. The timing circuit is programmed to measure the time the water/ice is subject to the selected and detected temperature, in order to ensure complete freezing of the water into ice cubes.

In various exemplary embodiments of the present invention, the control module communicates to an icemaker module through a switchboard located on the icemaker module. The switchboard contains a port for communicating with the control module and two switches. One switch is engageable by a bail arm shaft connected to a pivotable bail arm. The bail arm detects the presence of ice in a basin or ice bin such that when the level of ice in the bin exceeds a designated maximum level, the bail arm is unable to complete its downward travel to the designated home level and the bail arm shaft is prevented from disengaging from the switch actuator such that the switch remains closed. While the switch is closed, the icemaker ceases its repetitive ice-making cycles. When the level of ice in the bin drops below the designated level, the bail arm is free to return to its home position, the bail arm shaft disengages from the switch and the icemaker resumes its repetitious ice-making cycles. The other switch is the motor switch—when the switch is actuated, the motor will be powered to rotate and twist the ice tray a selected amount to expel freed ice cubes from the tray into the underlying basin or bin for storage and periodic removal for convenient use, or to reverse direction and return the icemaker components to their home positions to begin another cycle, as determined by the control module based on other inputs.

In various exemplary embodiments of the present invention, a control system for an automatic icemaker includes a first gear in the icemaker module. The motor output shaft turns a plurality of meshed gears comprising a gear train which engages the first gear to turn a first direction until it reaches a certain angle. The first gear is connected to an engagement key or other mechanical operator which is adapted to engage a coupled end of a twist-type icemaker. The turning of the first gear will rotate and twist the tray to allow the formed ice cubes to eject from the twist-type icemaker into an underlying ice bin. Once the gear turns a sufficient angular distance in the first direction, both switches will be engaged, and the motor will reverse direction. This will turn the first gear in the opposite or second direction; it will continue to rotate until the module returns to a "home" position.

These and other features and advantages of various exemplary embodiments of systems and methods according to this invention are described in, or are apparent from, the following detailed descriptions of various exemplary embodiments of various devices, structures and/or methods according to this invention.

BRIEF DESCRIPTION OF DRAWINGS

Various exemplary embodiments of the systems and methods according to this invention will be described in detail, with reference to the following Figures, wherein.

DETAILED DESCRIPTION OF EXEMPLARY EMBODIMENTS

The invention illustrated in the Figures disclosed herein is generally directed to one or more embodiments of a compact icemaker module for an automatic icemaker and a control system for operating the icemaker module. Referring to the various drawings, isometric and elevation views of exemplary embodiments of a compact icemaker module 101 are provided. The compact icemaker module 101 includes a housing 103 having a cover 105. The housing 103 and cover 105 house the internal components of the icemaker module 101. An engagement key 107 adapted to engage or be coupled to a twist-type icemaker tray, shown in FIG. 8, projects out from the internal components through an aperture 106 in the cover 105. Retention lugs 104 extend rearwardly from housing 103 for engagement with the end wall 160 of the adjacent frame 158 of the twist-type ice dispenser 151 shown in FIG. 8, and referenced below. In addition, the cover 105 includes an access opening 109 for receiving an electronic connector 138 from a control module 136 (shown in FIG. 9). A bail arm shaft 127, having a port 111 (shown in FIG. 2) for receiving and connecting a bail arm 123, projects through an aperture of the housing 103. The port 111 for connecting the bail arm 123 receives a bail arm connector member 125 (shown in FIG. 1) for fixedly connecting the bail arm 123 to the end of the bail arm shaft 127. The connector member 125 may be a conventional screw or any other known or unknown fastening means for fixedly attaching the bail arm 123 to the end of the bail arm shaft 111. Accordingly, as the bail arm shaft 127 rotates in operation, the bail arm 123 extends from the end of the shaft 111 and pivots generally perpendicular thereto for sensing and detecting the amount of ice in a conventional underlying ice bin (not shown) of a freezer (not shown).

Figure 1:
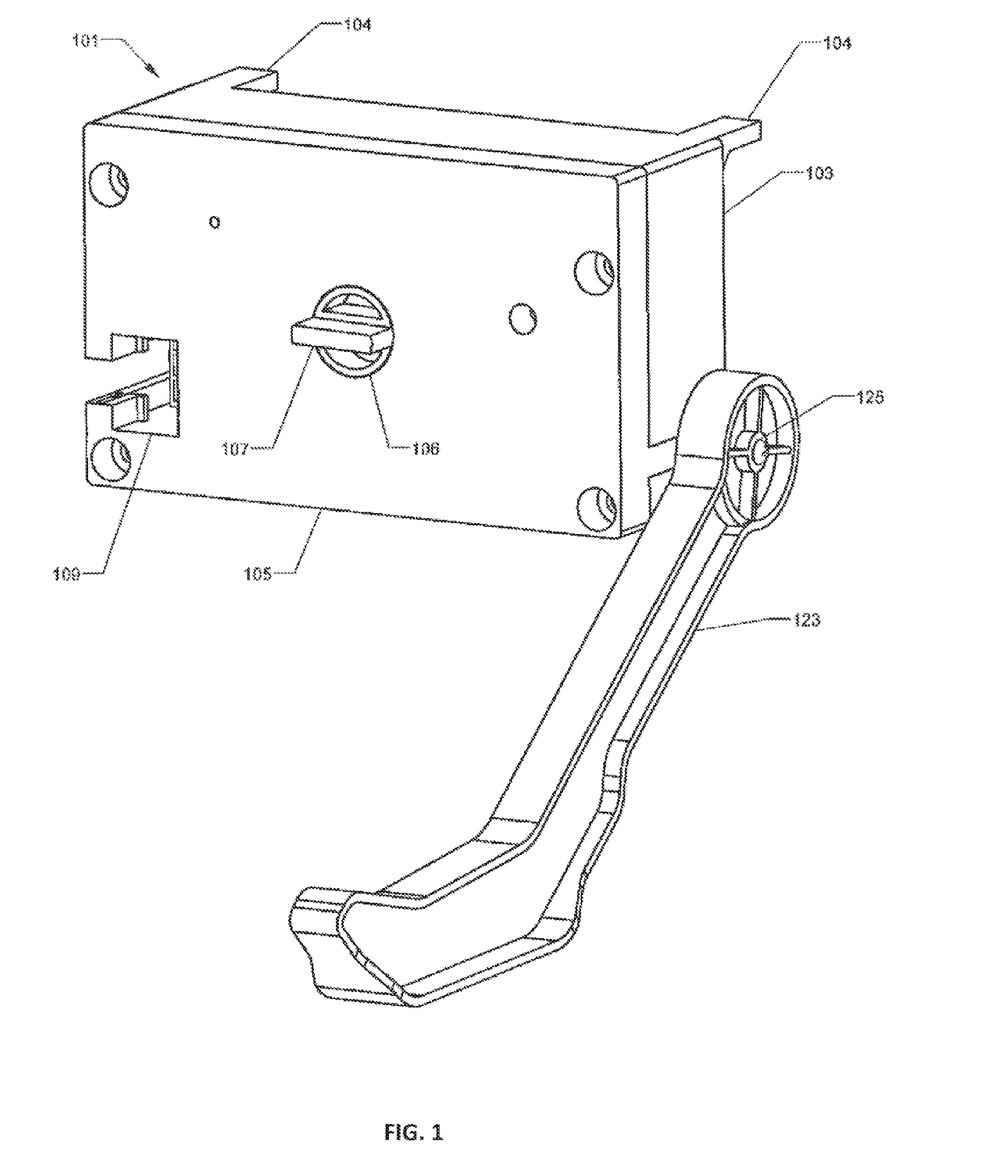
FIG. 1 is a front isometric view of an exemplary embodiment of a compact icemaker module for an automatic icemaker, with a connected bail arm shown in a home position.
Figure 2:
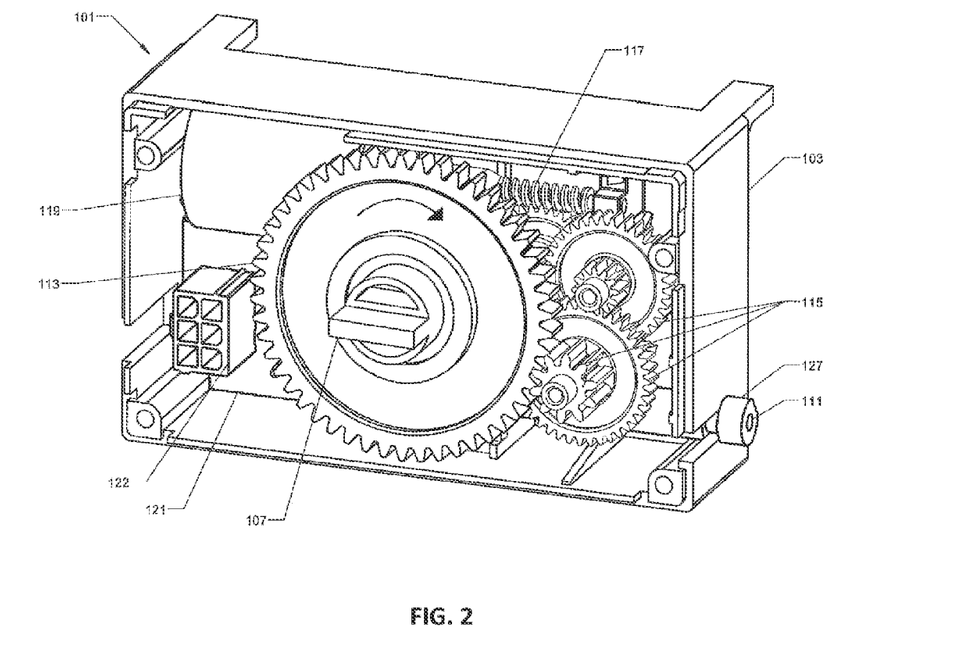
FIG. 2 is a front isometric view of the compact icemaker module of FIG. 1 with the cover and bail arm removed to illustrate the internal components of the icemaker module.
Figure 3:
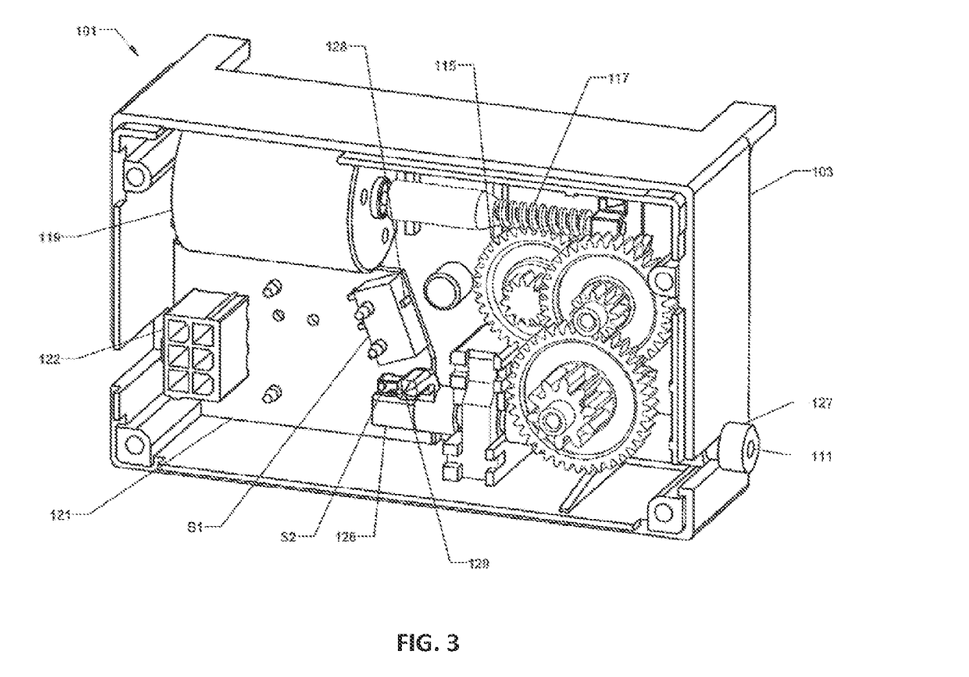
FIG. 3 is a front isometric elevation view of the compact icemaker module of FIG. 1 with the cover and bail arm removed and the first gear removed to illustrate internal components of the icemaker module.
Figure 4:
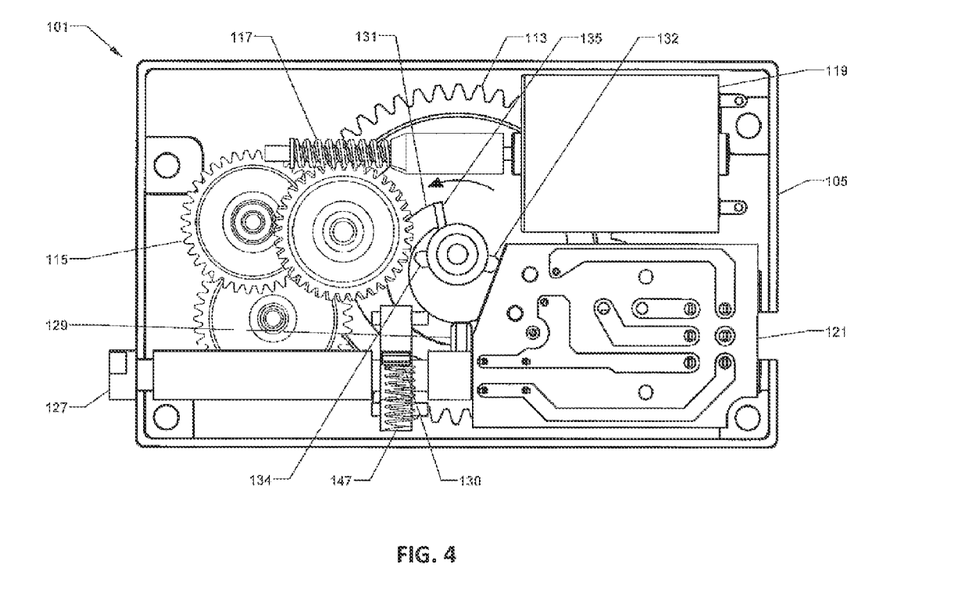
FIG. 4 is a rear elevation view of the compact icemaker module of FIG. 1 with the housing removed to provide a rear view, opposite the front view, of internal components of the icemaker module, and to illustrate the bail arm lever and other operating components of the icemaker module in a home position.
Figure 5:
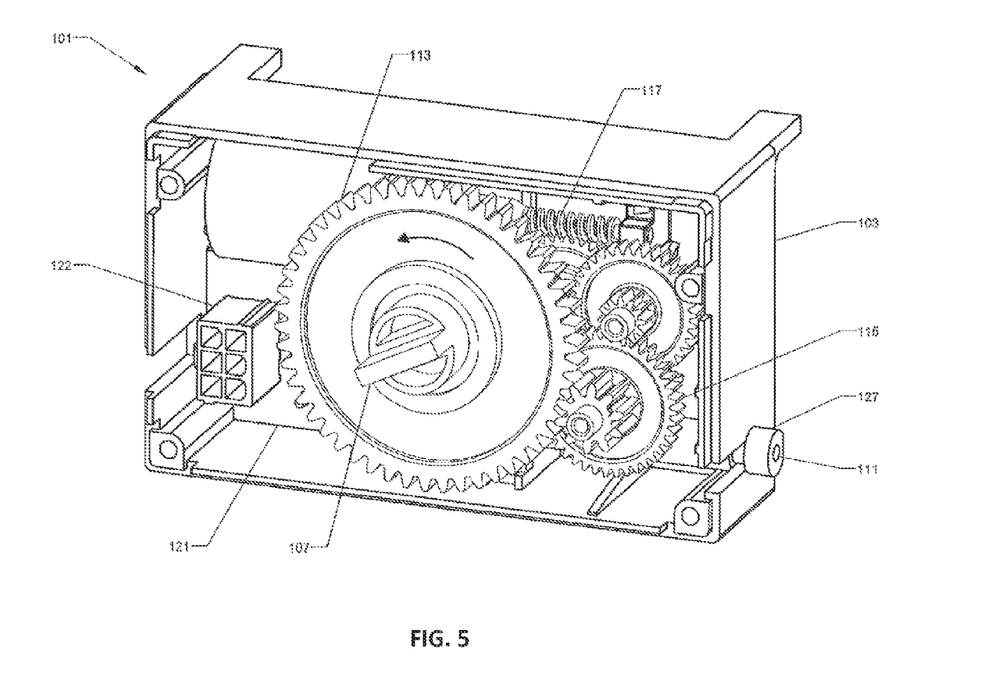
FIG. 5 is a front isometric view of the compact icemaker module of FIG. 1, with the cover and bail arm removed to illustrate the internal components of the icemaker module and with the first gear rotated in association with the bail arm lever in a second position, the bail arm lever not being visible behind the first gear.

Referring now to FIGS. 2-4, one or more views of the compact icemaker module 101 of FIG. 1 are variously provided with either the indicated cover 105 or housing 103 removed. The engagement key 107 is integrated into a first gear 113. Thus, as the driven first gear 113 rotates, the engagement key 107 will also rotate. The engagement key 107 engages a mating aperture in a tray mold 153 of a "twist" type ice dispenser 151, exemplarily shown in FIG. 8. Rotation of the first gear 113 in a first direction indicated by a clockwise directional arrow shown in the front elevation view of FIG. 2 will rotate, twist and partially invert the semi-rotatable tray mold 153 of the ice dispenser 151, thereby discharging the ice from the tray mold 153. The first gear 113 is linked to a plurality of meshed gears comprising a gear train 115 operatively connecting a motor drive shaft 117 to the first gear 113. The gear train 115 has a combined gear ratio such that the rotational force from a helical gear 117 driven by the output shaft of motor 119 is successively stepped down in speed and correspondingly stepped up in torque by the gear train 115 until it is transferred to the first gear 113. The gear train gear ratio is designed to allow the first gear to rotate at a desired speed for a desired amount of rotation and/or time, which may vary depending upon the design of the ice dispenser associated with the compact control module.

Figure 7:
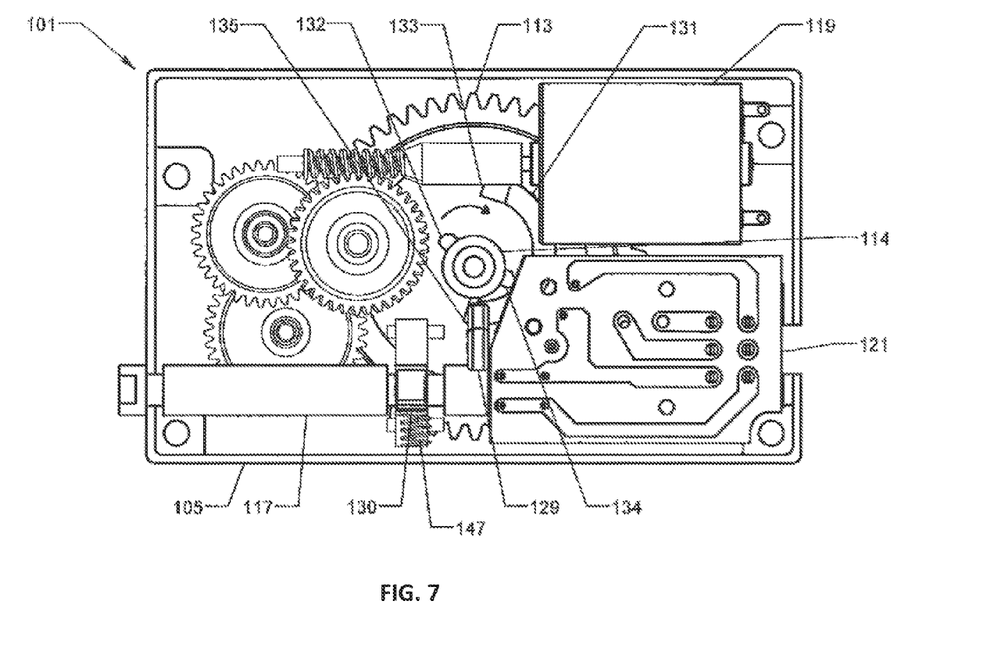
FIG. 7 is a rear elevation view of the compact icemaker module of FIG. 1 with the housing removed to provide a rear view, opposite the front view, of the internal components of the icemaker module, and to illustrate the bail arm lever in the second position.

The icemaker module 101 also includes a switch board 121 (FIG. 4), which incorporates a switch board connector port 122 for receiving multiple leads from the control module 136 via connector 138, and a pair of switches, S1 and S2, as best shown in FIG. 3. A bail arm shaft 127, which is associated with the port 111 for receiving a bail arm connector member 125, is in communication with and contacts the S2 switch. Specifically, the bail arm shaft 127 includes a flattened end projection 126 (FIG. 3) which extends axially from the interior end of the bail arm shaft 127 and is vertically oriented and spaced parallel to the surface of the switch S2 actuator surface when the bail arm shaft 127 is in its home position shown in FIG. 3. The bail arm shaft end portion 126 is adapted to selectively depress or otherwise engage and actuate switch S2 when the bail arm 123 and connected bail arm shaft 127 are positioned away from their home positions shown in FIGS. 1 and 8. The bail arm shaft 127 also includes a bail arm lever 129, which projects radially and angularly away from the bail arm shaft 127. The distal end of the bail arm lever 129 is adapted to engage a progressive inclined arcuate cam 131 projecting from the rear face of the first gear 113, as shown in FIGS. 4 and 7.

Figure 6:
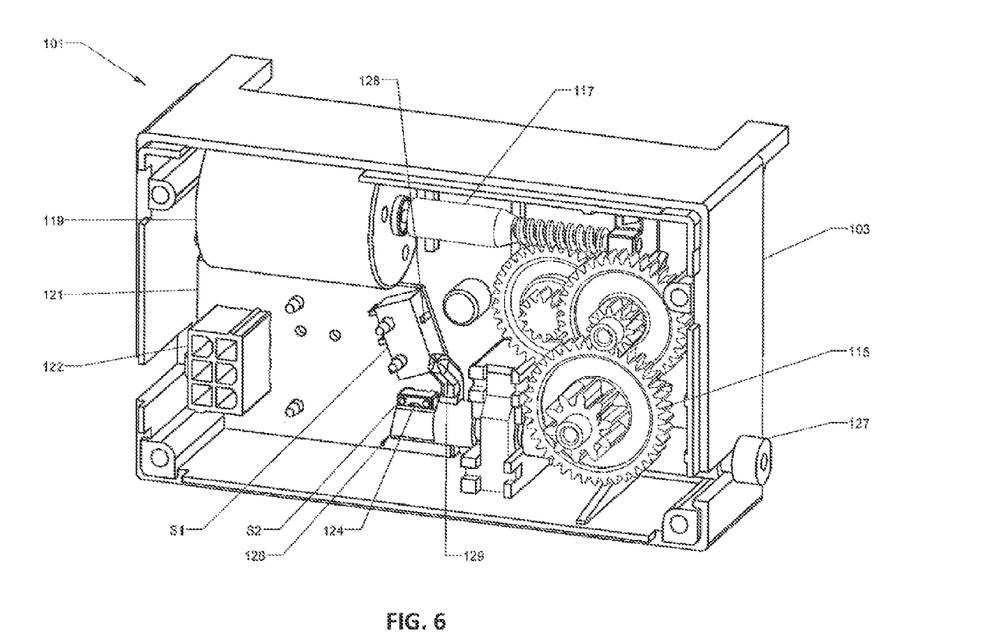
FIG. 6 is a front isometric view of the compact icemaker module of FIG. 5 with the cover removed and the first gear removed to illustrate internal components of the icemaker module with the bail arm lever in the second position.

The inclined arcuate cam 131 on the first gear 113 includes a first end 133 and a second end 135. The first cam end 133 projects a first distance outward from the rear face of gear 113, and the second cam end 135 projects a second distance from the rear face of the gear 113, which second said distance is greater than the first said distance. The rearwardly facing surface of the inclined arcuate cam extends on an arcuately inclined path from the shorter protruding first cam end 133 to the greater protruding second cam end 135, such that the distal end of the engaged bail arm lever 129 will be forced rearwardly and upwardly by rotation of the first gear 113 and the associated inclined arcuate cam in the first direction indicated by a counter-clockwise directional arrow shown in the rear elevation view of FIG. 4 to produce rotation of the bail arm shaft 127, which in turn will result in pivotal elevation of the free end of the bail arm 123 from its lower "full ice bin" home position illustrated in FIGS. 1 and 8, to a second position in which the lower side of the bail arm 123 is raised above its home position to an approximately horizontal position, as represented by broken line 123R in FIG. 8, to avoid interfering with ice cubes being discharged into the ice bin by the twist-type ice dispenser. Coincidently with rotation of the bail arm shaft 127, the partially flattened side of the bail arm shaft end projection 126 will rotate angularly to project against the actuator 124 (best shown in FIG. 6) of switch S2 to close switch S2.

The outer surface of the hub 114 of the first gear 113 includes a first outwardly extending radial cam portion 132 and a second outwardly extending radial cam portion 134. The outer margins of the first and second radial cam portions 132 and 134 are arcuately spaced about the hub 114 a distance approximately equal to the arcuate length of travel of the first gear 113, and are positioned such that when the first gear 113 is in its home position, as illustrated in FIG. 4, the first cam portion 132 will engage the actuator of switch S1, and when the first gear reaches its second position, as illustrated in FIG. 7, the second cam portion 134 will engage the actuator of switch S1. The actuator 128 of switch 1 is itself best shown in FIG. 6. When actuator 128 of motor switch S1 is depressed the first time in the icemaker module cycle by the first cam portion 132 as the first gear 113 reaches the end of its travel in the first direction, the microprocessor 137 of the control module 136 will instruct the motor 119 to reverse its direction of operation.

Figure 8:
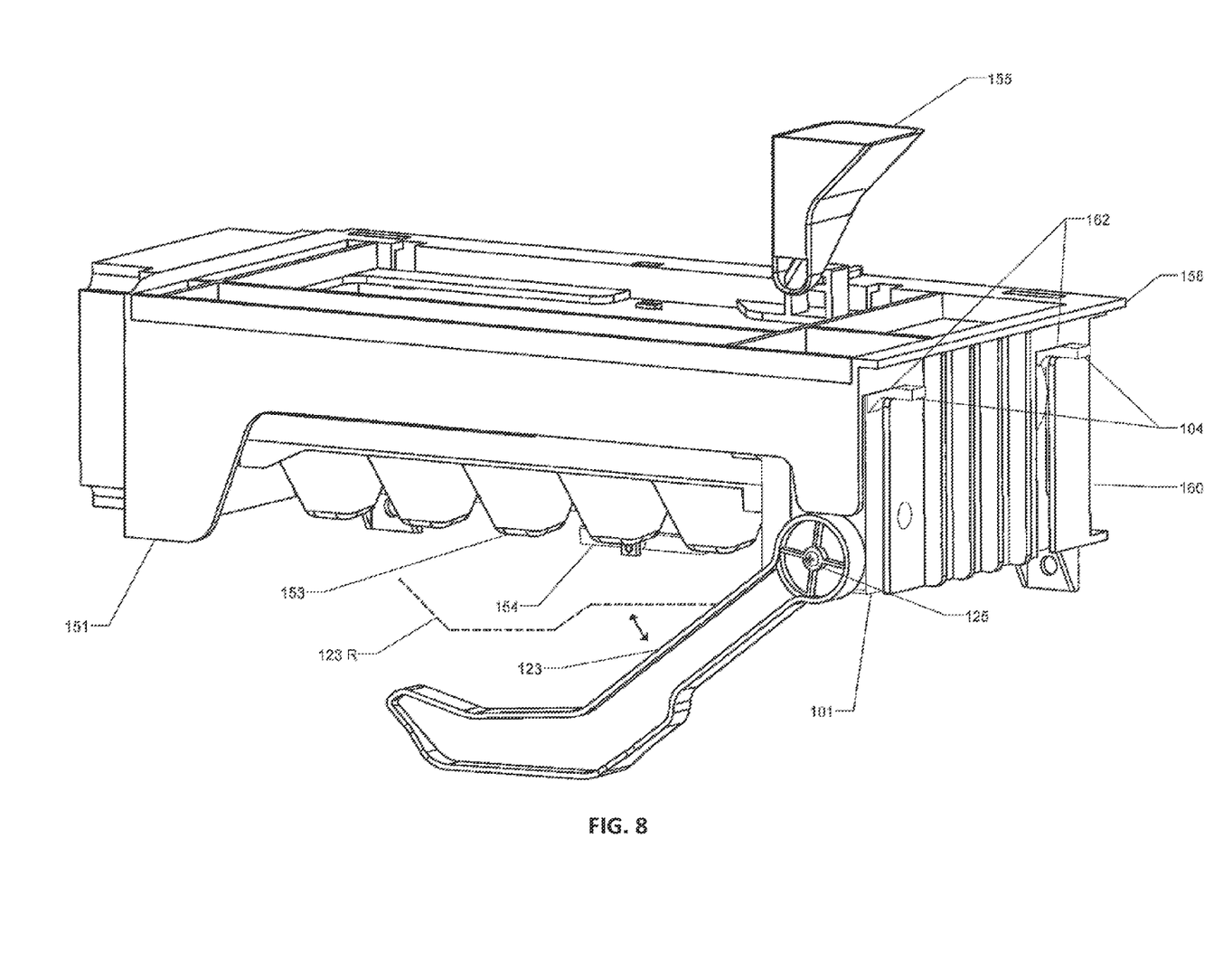
FIG. 8 is an isometric view of the compact icemaker module of FIG. 1 installed in an exemplary embodiment of a twist-type icemaker frame and engaged with an exemplary embodiment of a semi-rotatable twist-type icemaker tray, with all illustrated components shown in the home position.
Figure 9:
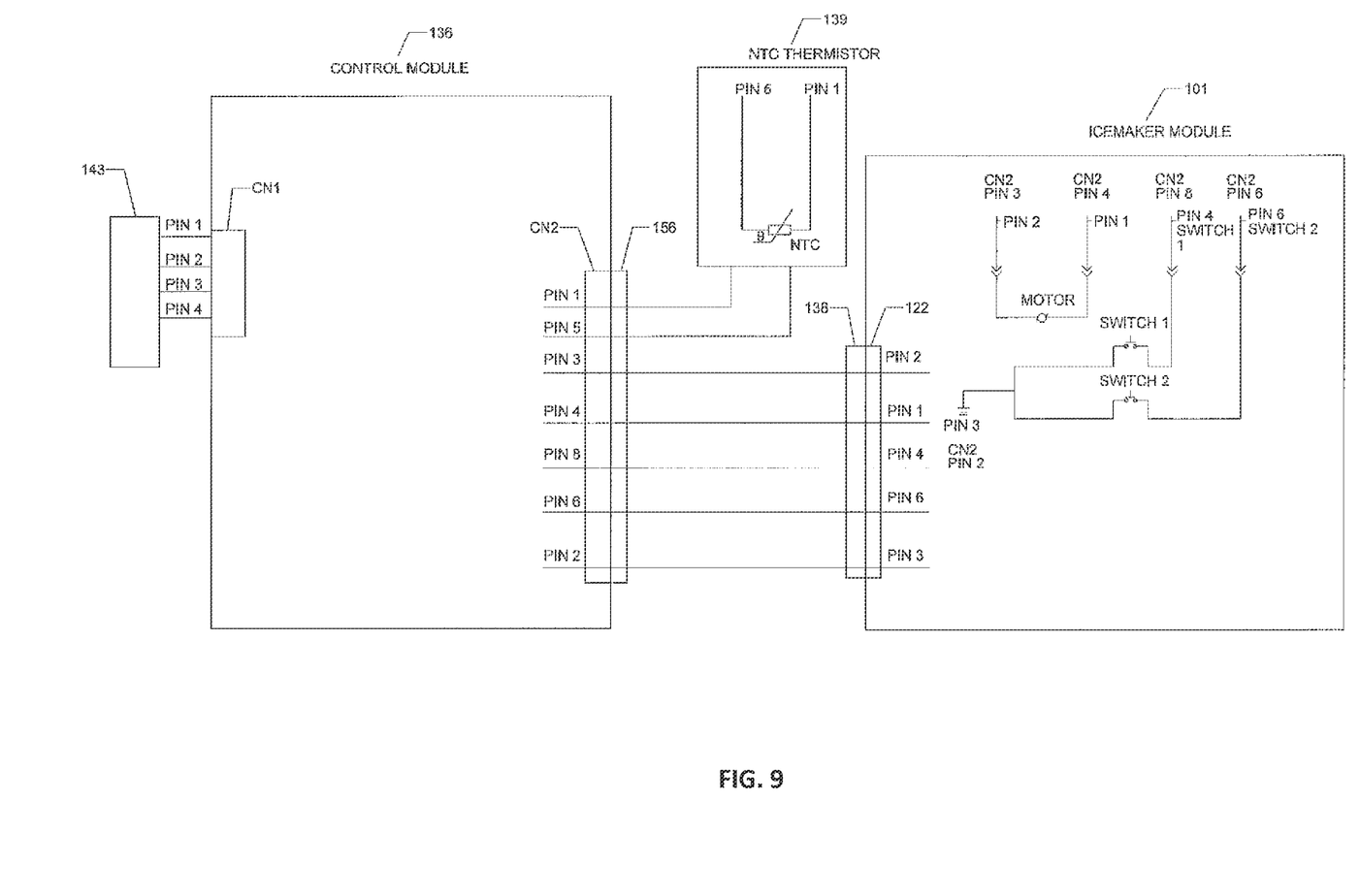
FIG. 9 is a schematic block diagram showing the relationship of the icemaker module, control module, NTC thermistor, and a connected refrigerator AC power source and solenoid water valve.

FIG. 9 illustrates one or more examples of an exemplary embodiment of the interaction between the control module 136, the NTC thermistor 139, and the icemaker module 101. The controller 137 (the system embedded in the control module 136) is in communication with the switch board 121 having switches S1 and S2. Further, the controller 137 is in communication with a thermistor 139. In an exemplary embodiment, the thermistor 139 is a negative temperature coefficient (NTC) thermistor. The thermistor 139 may advantageously be deployed within a protective casing 154 in close proximity to or in contact with the ice mold tray 153 of an exemplary embodiment of a twist-type icemaker 151, as shown in FIG. 8, to sense an associated pre-selected suitable ice forming temperature, such as 12° F., of the tray 153, and provide an associated resistance. FIG. 8 also illustrates the manner in which the retention lugs 104 projecting from the icemaker control modular body 103 engage with retaining slots 162 in the end wall 160 of the icemaker dispenser frame 158 to provide a rigid mount from which the icemaker control module 101 can exert a firm torque on the tray mold 153 of the twist-type icemaker dispenser 151 during ice ejection from the tray mold 153. The control module 136 also has a power adapter 143 for electrical engagement with an AC connector (not shown) provided within the associated refrigerator or freezer to access power conductors to operate the controller and control module. The control module 136 also includes an AC to DC converter 145, to provide DC current to operate the controller 137 and embedded microprocessor 237, icemaker control module 101, and associated motor 119.

Before further discussion relating to the operating cycle of the icemaker control module 101, it should be appreciated that if the amount of ice in an associated ice storage bin (not shown) which receives ice from the twist-type ice dispenser 151 reaches an elevated level where the ice bin is deemed "full," the bail arm 123 which extends from the bail arm shaft 127 into the ice storage bin and manually detects elevated ice level, will be unable to return to its lower home position, and the bail arm shaft 127 on which the bail arm 123 is fixedly mounted will likewise not complete its travel to its home position. Rotation of the bail arm shaft 127 away from its home position at the beginning of an operational cycle will cause the bail arm shaft axial flattened end projection 126 at the inner end of the shaft 127 to contact the bail arm detection switch S2 of the icemaker module 101. When switch S2 is depressed, the controller 137 connected to the switch board 121 will recognize that switch S2 is depressed and the bail arm is not in its lower home position. If at the end of the operating cycle, the bail arm is not permitted to return to its lower home position because the bail arm 121 is impeded by the ice cubes in a full ice bin, the bail arm shaft 127 end projection 126 will likewise not return to its home position, and the switch S2 will continue to be depressed. Accordingly, the controller 137 will not initiate an ice ejection operation cycle to deposit more ice cubes in the already "full" ice storage bin. Once the level of ice in the ice storage bin reaches a reduced level as a result of normal ice cube dispensing or removal on demand, the bail arm 123 and bail arm shaft 127 will again be fully rotated and returned to their home positions by a return spring 147 which is biased against a return flange 130 of the bail arm shaft 127, the projection 126 will no longer contact switch S2 which will now be open, and operation as described below will continue.

In operation and use, at the start of an operational cycle the control module 101 and its operating components will be in the "home position" which is illustrated in FIGS. 1-4, and the ice cube mold tray 153 will have been filled with water at the conclusion of the previous operational cycle. In the "home position," the first cam portion 132 will engage switch S1, the motor switch. The controller 137 and embedded microprocessor 237 will monitor the thermistor 139, open as discussed above. Once the thermistor 139 measures a desired or targeted temperature, for example, but not limited to, 12° Fahrenheit or less, and provides the associated resistance to the microprocessor 237, the controller 137 will initiate a timer embedded in the microprocessor 237. The timer will run for a predetermined period of time sufficient to insure complete freezing of ice cube formation, for example fifty minutes, before the control module 101 will operate. Once the timer 141 completes its timing operation, the controller 137 will instruct the control motor 119 to run. As such, the motor 119 will begin operation, thereby causing gear train 115 rotation and the resulting rotation of the first gear 113 in a first direction (which is clockwise as viewed in FIG. 2 or 5). An exemplary motor 119 may be a 12 volt DC 0.45 watt motor. As the first gear 113 rotates in the first direction away from its home position, the first radial cam portion 132 will no longer depress switch S1, while the arcuate inclined cam first end 133, and specifically the inclined arcuate cam 131, will engage the bail arm lever 129 and progressively move the bail arm lever up (compare FIG. 4 showing the internal icemaker control module components in home position when the bail arm lever is down, with FIG. 7 showing the same internal icemaker components in the second position when the bail arm lever is normally up). During the rotation of the first gear 113, the driven end of the associated ice tray 153 containing the frozen ice cubes will be rotated by its engagement with the engagement key 107 projecting from the first gear 113 until the end of the tray distal to the engaged end reaches and is engaged by a stop, which prevents further rotation of the ice tray distal end, while the first gear 113 engaged with the driven end of the ice tray continues to rotate. This will result in physical twisting of the ice tray. In an exemplary embodiment, first gear 113 may rotate approximately one hundred and sixty degrees, which translates to the ice tray driven end rotating accordingly, and the tray being twisted during approximately the last sixty degrees of that rotation to break the ice cubes loose from the tray mold and allow the cubes to fall into the ice bin (not shown) located beneath the tray. When twisted in this manner, the ice will be ejected from the ice tray mold without requiring any power consuming heat applied to the tray. It should be appreciated that the amount of rotation of the first gear 113 and associated amount of rotation and twisting of the ice tray, may be any amount suitable for the ejection of ice from the ice tray depending upon the design and the material of the plastic tray. As such, the amounts of rotation and/or twisting disclosed herein are provided as an example and should not be considered limiting.

As the rotation of the first gear 113 approaches the end of its clockwise first direction travel, the second cam portion 134 will contact and close switch S1 (see FIG. 7). Accordingly, both switches S1 and S2 will be depressed. When both switches S1 and S2 are depressed, the controller will reverse the polarity of the leads to the motor 119 to cause the motor to operate in reverse. The first gear 113 will then begin to rotate in a second direction, opposite the first direction, which is indicated by the counter clockwise directional arrow as viewed in the front elevation view of FIG. 5, and the clockwise directional arrow as viewed in the rear elevation view of FIG. 7.

The first gear 113 will continue to rotate in the second direction until the first cam portion 132 contacts and closes switch S1. This is the "home position" illustrated in FIGS. 1-4. Once the first cam portion 132 contacts switch S1, the controller 137 will instruct the motor to stop. The bail arm lever 129 should rotate downward as the first gear 113 rotates in the second direction after the ice cubes have been ejected from the ice tray 153, as the return spring 147 will apply sufficient force to the bail arm shaft 127 to cause it to rotate back toward its home position as permitted by the decreasing radius of the rotating cam surface of the inclined arcuate cam 131 slidingly engaged with the bail arm lever 129. Only if the bail arm is prevented from fully returning to its lower home position due to a full ice bin will the bail arm shaft not rotate fully to its lower home position and open switch S2. Once the first cam portion 132 contacts switch the controller 137 will provide shut off the motor 119 and send a electrical current to a solenoid valve (not shown) in the water line of the associated refrigerator-freezer to open the valve and direct water through a water line extending into the freezer compartment to a funnel 155 (See FIG. 8) emptying into the icemaker tray for a set period of time, for example 7.5 seconds, to fill the ice cavities of the mold with water, and begin the freezing of the water to form ice cubes. This completes the operational cycle, which will periodically repeat from the "home position" forward as described above, except 1) when the ice bin is full and the bail arm 123 is prevented from reaching its home position when the first gear 113 returns to its home position by the ice in the bin, and from enabling the bail arm shaft flattened end projection 126 to break contact with the actuator of switch S2; or 2) when the control module 136 is powered down or otherwise deactivated.

FIG. 9 schematically illustrates the exemplary icemaker control system logic. At a high level, FIG. 9 shows the power adaptor 143 which communicates with the control module 136, which communicates with the NTC thermistor 139 and icemaker module 101.

The power and water control signals from a refrigerator freezer are connected to a four-pin power adaptor 143. The adaptor 143 connects to the control module 136 via the CN1 four-prong connector. The AC power is sent from the refrigerator's built-in AC power supply (not shown) through the four-pin adaptor 143 to the control module 136 via the CN1 four-prong connector. The water line control (CN1 Pin 3) likewise is connected through the adaptor 143 and connects the control module 136 via the CN1 connector to the water line control which is a solenoid valve (not shown).

The control module 136 eight-pin connector CN2 communicates with a control module adaptor 156 which connects two prongs of CN2 to the NTC thermistor 139, and five prongs of CN2 to the icemaker module 101. Pin 1 and Pin 5 of CN2 communicate with the NTC thermistor 139, which supplies a temperature-dependent resistance to the control module connector 136.

Pins 2, 3, 4, 6 and 8 of connector CN2 communicate through the adaptor 156 with the icemaker module 101 through a six-prong adaptor 138. This six-prong adaptor plugs into the icemaker module switch board connector port 122. Through these adaptors and connectors, Pin 2 of CN2 communicates with Pin 3 of the icemaker module connector port 122. This connection allows the control module 136 to communicate with switch S1 and switch S2 on the icemaker module 101. Pin 8 of CN2 connects to Pin 4 of the icemaker module 101, which allows the control module 136 to communicate with switch S1. Pin 6 of the CN2 connects to Pin 6 of the icemaker module 101, which allows the control module 136 to communicate with switch S2.

Pin 3 and Pin 4 of CN2 communicate with Pin 2 and Pin 1 of the icemaker module. These connections allow the control module 136 to communicate with the DC motor 119 located on the icemaker module 101.

Figure 10:
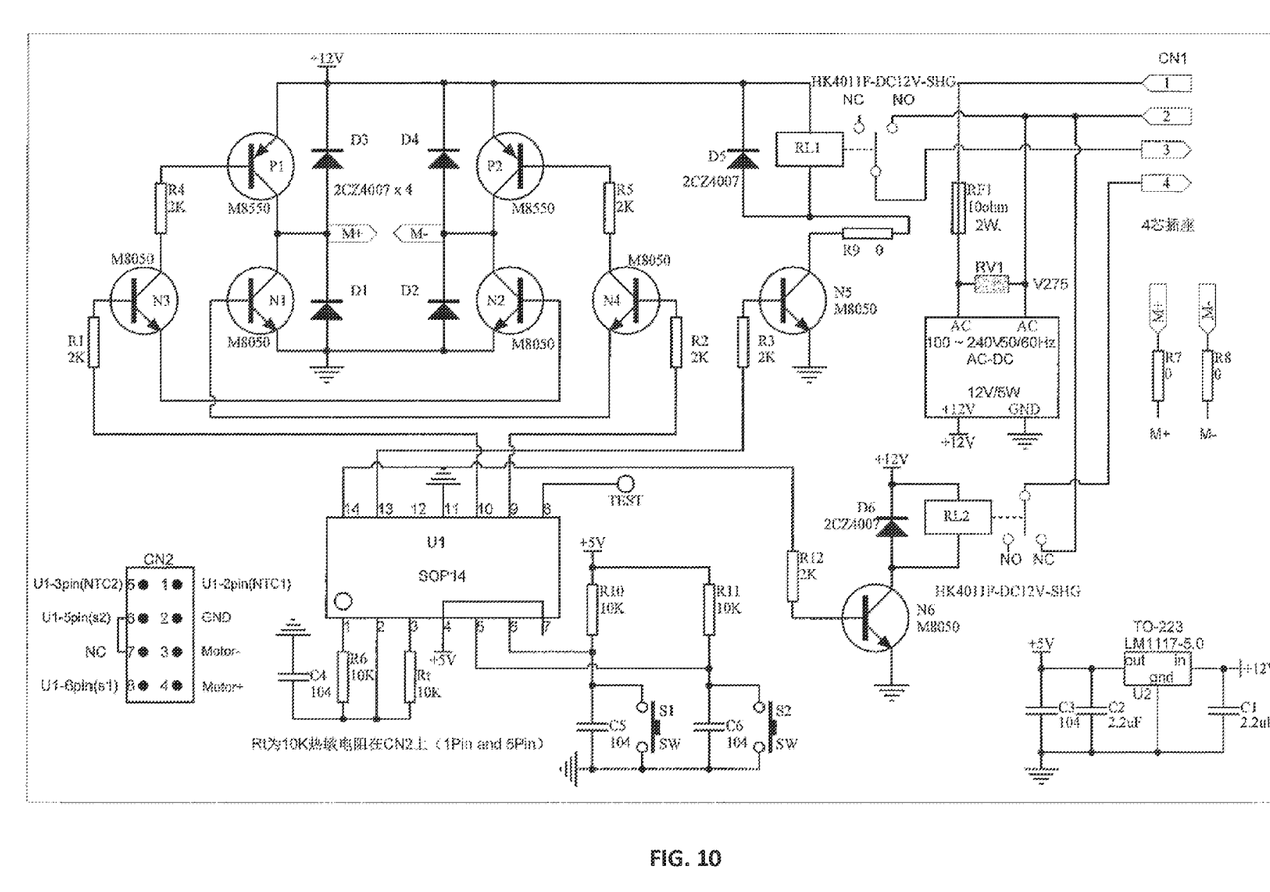
FIG. 10 is an exemplary schematic diagram of a control module for operating the compact icemaker module of FIG. 1.

Moving to FIG. 10, a detailed view of the exemplary control module 136 is shown. The AC power enters via Pin 1 and Pin 2 of connector CN1 (top right). The power travels to the AC-DC converter 145, which converts the supply to 12V DC power. Various components of the system require either a 5V or a 12V signal.

The microprocessor 237 is embedded in the controller 137 and has fourteen pins. The microprocessor 237 accepts a 5V signal. Therefore, the 12V signal must pass through a 12V to 5V converter 146. The converted signal allows the control module to communicate with switches S1 and S2 of the icemaker module, internally through Pin 5 and Pin 6 of the microprocessor 136, and externally through Pin 6 and Pin 8 of connector CN2.

The NTC thermistor 139 shown in FIG. 9 likewise operates on a converted 5V signal. The signal is communicated to the NTC thermistor 139 located within protective cover 154 attached to the ice cube tray 153 shown in FIG. 8 by Pin 1 and Pin 5 of connector CN2.

The motor runs on a 12V signal. The 12V signal for the motor 119 is transmitted to terminals M+ and M− in the upper left-hand quadrant of FIG. 10. The signal and power is then sent to the motor on the icemaker module via Pin 3 and Pin 4 of connector CN2. The operation of the motor is governed in part by the position of switches S1 and S2, which is illustrated further in FIG. 10.

Figure 11:
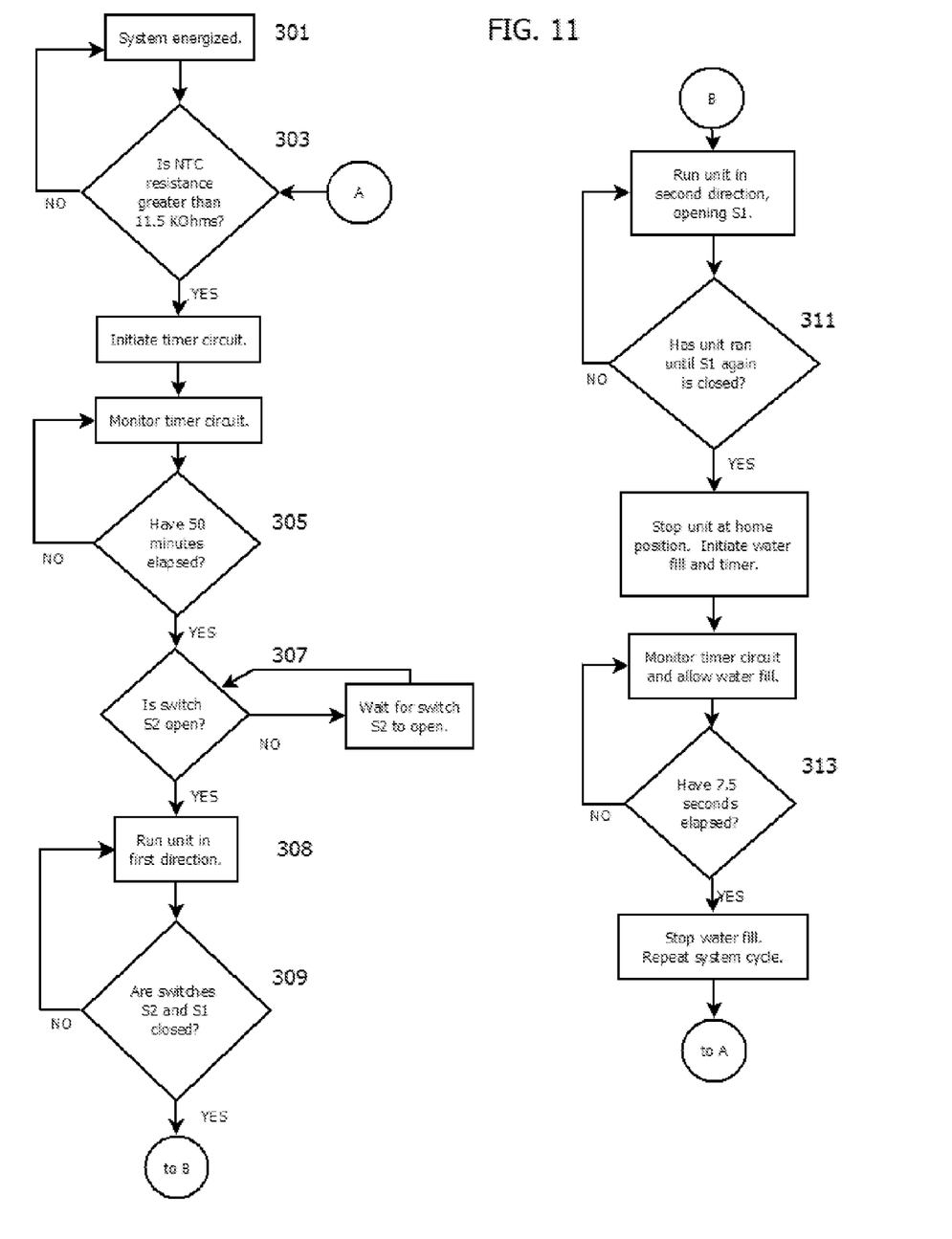
FIG. 11 is an exemplary flow diagram for the energy saving icemaker control system for the compact icemaker control module of FIG. 1.

The water signal activation is facilitated by relay RL1, which is signaled by switch S1 via Pin 13 of the microprocessor 237, which controls the relevant timing as illustrated further in FIG. 11. Ultimately, the water signal is sent from the control module 136 through connector CN1 Pin 3 to the solenoid control of valve (not shown) for the waterline within the refrigerator/freezer (not shown).

The motor cutoff functionality is governed by relay RL2 which communicates with switch S2; the cutoff signal is sent through CN1 Pin 4. When relay RL2 is NO (normally open), there is no shutoff to the motor—current is allowed to run normally to the motor. When relay RL2 is NC (normally closed), CN1 Pin 4 will shut off power to the motor through its connection with CN1 Pin 1 by way of CN1 Pin2.

FIG. 11 summarizes the process executed by a cycle of the system disclosed herein. First, the system is deem energized 301. The system is energized through the AC power supply provided from the refrigerator (not shown), which is converted to DC power in the controller 137. The DC power is then sent to the icemaker control module 101 by connector CN2. A cycle normally starts directly after conclusion of water fill at the end of the previous cycle.

In the next step 303, the system consults the exemplary NTC thermistor 139, which provides an increased resistance as the water-filled ice cube tray 153 becomes colder. This information is relayed to the microprocessor 136, which, when the resistance is greater than (in the exemplary embodiment shown here) 11.5 KOhms, initiates a timer on the microprocessor 237.

In the next step 305, the unit monitors the timer circuit for a selected time period. Once the selected time period (here, shown as 50 minutes) has expired, the ice cubes should be sufficiently frozen, allowing the icemaker module 101 to begin its process.

In the next step 307, the system checks whether switch S2 is open. If switch S2 is closed, the system will wait for the switch to open. While it waits, the system will switch relay RL2 from NO (normally open) to NC (normally closed), preventing power from reaching the motor and thereby pausing the cycle. Switch S2 will once again open (thereby changing relay RL2 from NC to NO and allowing power to the motor) when the bail arm returns to its lower home position.

When S2 is open, in the next step 308 the system will run the motor in a first direction. As shown in step 309, the unit will continue to run in the first direction until switches S1 and S2 are closed when the unit reaches its second position. When both switches are closed, the control module will reverse the polarity of the motor 119, causing the motor to run in a second direction. Switch S1 will thereafter be released.

In step 311, the motor 119 will continue to rotate in the second direction until switch S1 is closed for the second time in the cycle. The controller will then stop the motor 119 with the first gear 113 back in its home position, and initiate the water fill and a timer. Once 7.5 seconds have elapsed (step 313), the system will stop the water fill. The system will then repeat the cycle.

The compact control module and system for an automatic icemaker disclosed herein has certain advantages. The compact control module uses less energy, resulting in cost savings for the end user and a higher energy star rating for the associated refrigerator/freezer. The energy reduction is accomplished by eliminating the heater element associated with a rake type ice mold, and replacing the rake type mold with a twist-type ice mold. This allows for ice ejection from the mold without requiring the application of heat to the mold. In addition, implementing a DC motor reduces energy consumption, as an AC motor consumes approximately 3.0 watts, more than six times the approximately 0.45 watts consumed by the DC motor. The energy consumption reduction also, as indicated, reduces the operating cost of the compact control module for an automatic icemaker, resulting in monetary savings for users. Further, the equipment cost associated with the compact control module for an automatic icemaker is reduced, as DC motors are typically less expensive than AC motors. This results in cost savings for manufacturers and equipment purchasers. In addition, the compact control module for an automatic icemaker is self controlled. The associated icemaker does not require input or any electronic control signals from the main control (s) of the associated refrigerator or freezer. The compact control system for an automatic icemaker operates independently without regard to other functions of the associated refrigerator or freezer. The icemaker requires AC power and a water line from the refrigerator, which is signaled by the controller to provide water to the ice mold, substantially simplifying integration of the compact control module into a large variety of refrigerators or freezers, and providing ease for repairs or replacement. These and other advantages are realized by the compact control module for an automatic icemaker disclosed herein.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g., attached, coupled, connected, associated) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although various representative examples of embodiments of this invention have been described above with a certain degree of particularity, those skilled in the art could make numerous alterations to the disclosed embodiments without departing from the spirit or scope of the inventive subject matter set forth in the specification and claims. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

Although the present invention has been described with reference to particular embodiments, persons skilled in the art will recognize that changes may be made in form and detail without departing from the spirit and scope of the invention.

The invention claimed is:

1. A compact icemaker control system for an automatic icemaker comprising:
    an icemaker module including a first gear having a first side with an engagement key for engaging a twist-type ice mold tray and a second side having a plurality of cams including a progressive cam member and first and second cam portions;
    a plurality of meshed gears comprising a gear train connecting a motor drive shaft to the first gear to rotate the first gear in a first direction between a home position and a second position to twist an ice mold tray to eject ice therefrom, and in a second direction between the second position and the home position to return the ice mold tray to its home position;
    a direct current motor coupled to the motor drive shaft;
    a switch board in operable communication with the direct current motor, the switch board having a first S1 switch and a second S2 switch;
    a bail arm shaft having a projection adapted to engage the second S2 switch, a bail arm lever extending from the bail arm shaft and biased to engage the progressive cam member to effect rotation of the bail arm shaft in response to rotation of the first gear, a bail arm connected to the bail arm shaft for pivotal movement of the bail arm in response to rotational movement of the bail arm shaft, and
    each of the first and second cam portions being adapted to engage the first S1 switch, wherein the first cam portion is adapted to engage the first S1 switch when the first gear reaches its home position and the second cam portion is adapted to engage the first S1 switch when the first gear reaches its second position.

2. The compact icemaker system of claim 1 wherein the switch board is in operable communication with a control module including a controller adapted to be in operable communication with an AC power source, the controller further including an AC to DC converter to provide DC current to the electric motor, and to the controller for controlling the operation of the motor.

3. The compact icemaker control system as provided in claim 2 wherein the controller includes a thermistor for sensing the temperature of an ice mold tray associated with an automatic icemaker and communicating a resistance associated with a selected temperature of the ice tray desired for ice cube formation to the controller.

4. The compact icemaker control system of claim 3 wherein the thermistor is a negative temperature coefficient type.

5. The compact icemaker control system of claim 1, wherein the icemaker module is coupleable to a twist-type icemaker frame engaging a semi-rotatable twist-type ice mold tray having a connected end and a distal end, wherein the engagement key of the first gear is coupleable to the connected end of the tray to cause rotation of the connected end in conjunction with rotation of the first gear, and wherein the frame will permit rotation of the tray connected end a first distance and will permit rotation of the distal end of the tray a second distance which is less than the first distance, whereby rotation of the connected end a distance greater than the second distance will result in twisting of the tray to expel ice formed within the tray.

6. The compact ice control system of claim 1, wherein rotation of the first gear in the first direction away from its home position will result in rotation of the bail arm projection to engage the S2 switch and thereby signal a system controller that the bail arm is not in its lower home position, and wherein rotation of the first gear in the second direction back to its home position will result in rotation of the bail arm to cause the bail arm projection to disengage the S2 switch to signal that the bail arm has returned to its lower home position and cause the controller to initiate a new ice ejection operation cycle, and further if the biased bail arm is prevented from returning to its lower home position during full return rotation of the first gear by an accumulation of ice cubes in an associated storage bin to a level above the lower home position of the bail arm the bail arm projection will not disengage the S2 switch and the controller will not initiate an ice ejection operation cycle to deposit more ice cubes in the storage bin until the storage bin ice level has been reduced to a level permitting the biased bail arm to return to its lower home position and the bail arm projection to disengage the S2 switch.

7. The compact ice control system of claim 1, wherein the icemaker is signaled to fill water into the ice mold tray when the first cam portion engages the first S1 switch when the first gear reaches its home position.

8. A method of operating a compact icemaker control system for an automatic icemaker comprising the steps of:
    providing a first gear in a home position wherein a first cam portion thereof engages a first S1 switch;
    starting a first timer period when a thermistor measures a targeted ice forming temperature;

rotating the first gear in a first direction after completion of the first timer period;

disengaging the first cam portion from the first S1 switch;

engaging a bail arm lever on a bail arm shaft through a progressive cam portion of the first gear as the first gear rotates in the first direction such that a projection on the bail arm shaft engages a second S2 switch;

rotating the first gear in a second direction opposite the first direction when both the first S1 switch and the second S2 switch are simultaneously closed and continue such rotation in the second direction until the first gear returns to the home position and a second cam portion closes the first S1 switch; and signaling an icemaker to fill water into the icemaker unit for a second period of time.

9. The method of operating a compact control system of claim 8 wherein the first period of time is approximately 50 minutes.

10. The method of operating a compact control system of claim 8 wherein the second period of time is approximately 7.5 seconds.

11. The method of operating a compact control system of claim 8, further comprising engaging the first gear with a twist-type ice mold tray whereby rotating the first gear in the first direction will twist the ice tray to eject ice therefrom.

12. The method of operating a compact control system of claim 8, further comprising obtaining power from an alternating-current outlet.

13. The method of operating a compact control system of claim 9, further comprising transforming the power using an AC to DC converter.

14. The method of operating a compact control system of claim 11, further comprising rotating the first gear in the first direction for up to approximately one hundred and sixty degrees.

* * * * *

UNITED STATES PATENT AND TRADEMARK OFFICE
CERTIFICATE OF CORRECTION

| | |
|---|---|
| PATENT NO. | : 9,528,741 B2 |
| APPLICATION NO. | : 14/479065 |
| DATED | : December 27, 2016 |
| INVENTOR(S) | : Subera |

It is certified that error appears in the above-identified patent and that said Letters Patent is hereby corrected as shown below:

In the Specification

In Column 6, Line 23, delete "control modular body 103" and insert -- control modular body 101 --, therefor.

In Column 6, Line 57, delete "bail arm 121" and insert -- bail arm 123 --, therefor.

In Column 8, Line 21, delete "switch the" and insert -- switch S1, the --, therefor.

In Column 8, Line 23, delete "a electrical" and insert -- an electrical --, therefor.

In Column 9, Line 23, delete "microprocessor 136," and insert -- microprocessor 237, --, therefor.

In Column 9, Line 62, delete "microprocessor 136," and insert -- microprocessor 237, --, therefor.

In the Claims

In Column 12, Line 7, in Claim 2, delete "icemaker system" and insert -- icemaker control system --, therefor.

In Column 12, Line 37, in Claim 6, delete "ice control system" and insert -- icemaker control system --, therefor.

In Column 12, Line 51, in Claim 6, delete "the bail arm".

In Column 12, Line 58, in Claim 7, delete "ice control system" and insert -- icemaker control system --, therefor.

Signed and Sealed this
Fifteenth Day of August, 2017

Joseph Matal
*Performing the Functions and Duties of the
Under Secretary of Commerce for Intellectual Property and
Director of the United States Patent and Trademark Office*

CERTIFICATE OF CORRECTION (continued)
U.S. Pat. No. 9,528,741 B2

In Column 13, Line 16, in Claim 9, delete "compact control system" and insert -- compact icemaker control system --, therefor.

In Column 14, Line 1, in Claim 10, delete "compact control system" and insert -- compact icemaker control system --, therefor.

In Column 14, Line 4, in Claim 11, delete "compact control system" and insert -- compact icemaker control system --, therefor.

In Column 14, Line 8, in Claim 12, delete "compact control system" and insert -- compact icemaker control system --, therefor.

In Column 14, Line 11, in Claim 13, delete "compact control system" and insert -- compact icemaker control system --, therefor.

In Column 14, Line 14, in Claim 14, delete "compact control system" and insert -- compact icemaker control system --, therefor.